(No Model.)
J. BUCHANAN.
GRAIN THRASHER AND SEPARATOR.
No. 271,310. Patented Jan. 30, 1883.
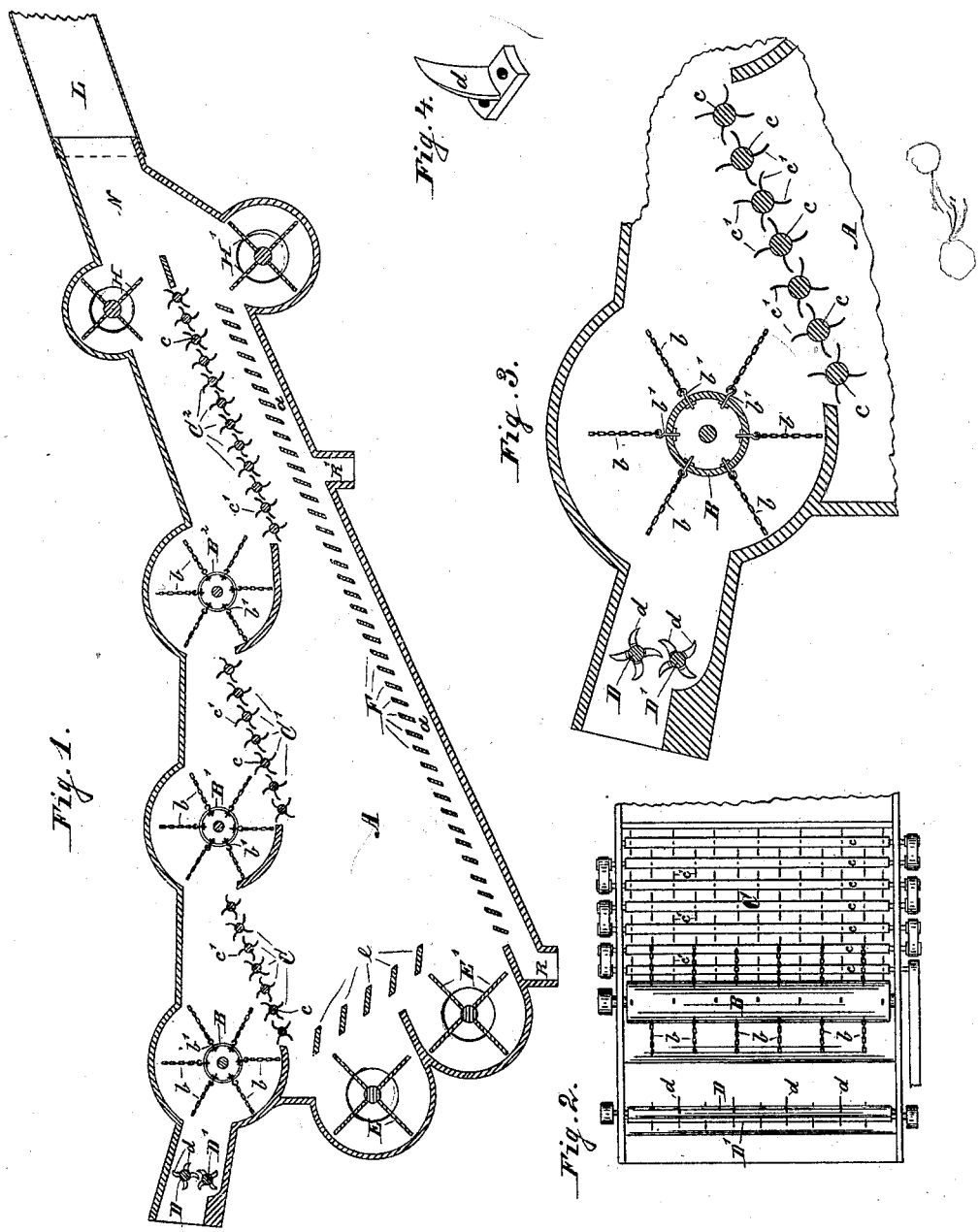
WITNESSES:
Bernh. J. Lizius.
Gottfr. Koehler.
INVENTOR:
James Buchanan.
Per James B. Lizius & Co.
Attorneys.

UNITED STATES PATENT OFFICE.

JAMES BUCHANAN, OF INDIANAPOLIS, INDIANA.

GRAIN THRASHER AND SEPARATOR.

SPECIFICATION forming part of Letters Patent No. 271,310, dated January 30, 1883.

Application filed November 20, 1882. (No model.)

*To all whom it may concern:*

Be it known that I, JAMES BUCHANAN, a citizen of the United States, residing at Indianapolis, in the county of Marion and State of Indiana, have invented new and useful Improvements in Grain Thrashers and Separators, of which the following is a specification.

In the accompanying drawings, Figure 1 is a vertical longitudinal section through the entire machine. Fig. 2 is a plan showing the automatic band-cutters, the thrashing-cylinder, and straw-carrier. Fig. 3 is a vertical longitudinal section through the same on a larger scale. Fig. 4 is a detail view of one of the knives forming automatic binder-cutters.

The same letters refer to the same or corresponding parts throughout the several views.

The automatic band-cutters are formed of knives $d$ $d$, formed independently of each other and bolted to feed-rollers D and D', so that the knives on the two rollers do not operate opposite each other, but are intercurrent. In case one knife is broken or becomes dull it can be taken off and a new one bolted in its place.

Secured to the thrashing-cylinders B, B', and $B^2$ upon their perimeters are bolts $b'$, with eyes in their outer ends, to which to attach iron chains $b$ to beat the straw and separate the grain.

The straw-carriers C, C', and $C^2$ are formed of rollers $c$ $c$, with pins $c'$ $c'$ secured to rollers, so that those of one roller work between those of the adjoining rollers and carry the straw to the rear of the machine, at the same time shaking the straw and separating the grain from the straw.

The fans E and E' at the front end of the machine create a double current of air drawn in through the eyes in the casing A, and separate the chaff and dirt from the grain that has been beaten out by thrashing-cylinders B, B', and $B^2$, and drive the chaff out at the rear end, N, of the machine. To increase this draft, the fans H and H' are placed near the rear end of the machine, which, combined with fans E and E', force the straw and chaff out of the machine into and through chute L, which acts as a straw-stacker.

Slats $e$ in chamber A are to prevent the grain beaten out by cylinder B from dropping upon fans E and E'. Slats F in chamber A are to prevent the current of air created by fans E and E' from acting on the grain that has been beaten from the straw, cleaned, and dropped to the floor of chamber A, so as to allow it to pass out of the passage $a$ at openings R and R'.

The carriers C, C', and $C^2$ are operated by a driving-belt and pulleys arranged on the outside of the machine, and so disposed that all the rollers $c$ revolve in the same direction.

The sheaves of grain pass between feed-rollers D' and D. The bands are cut by knives $d$, which are spaced so closely that no band can escape cutting. The sheaves pass under cylinder B, where they are beaten by the chain-thrashers $b$ $b$ on cylinder B, then taken by carrier C to cylinder B', where they are thrashed again by the chain-thrashers on cylinder B', then conveyed by carrier C' to cylinder $B^2$, and thence by carrier $C^2$ to the rear end of the machine, where, by aid of fans H and H', the straw is forced through the chute L, which acts as a stacker.

As the grain is beaten from the straw it drops into chamber A, together with the chaff, where it is acted on by the current of air from fans E and E', the grain dropping through slats F into passage $a$, whence it passes out at openings R and R'. The chaff and dirt are driven to the rear and pass out with the straw into chute L.

What I claim, and desire to secure by Letters Patent, is—

1. The combination, in thrashing and separating machines, of the cylinder B, beating-chains $b$, and bolts $b'$, substantially as set forth.

2. The combination, in thrashing and separating machines, of fans E and E', chamber A, slats $e$, slats F, fans H and H', and straw-chute L, substantially as described, and for the purpose set forth.

3. The combination, in thrashing and separating machines, of feed-rollers D' and D, knives $d$, cylinders B B' $B^2$, beating-chains $b$ and bolts $b'$, rollers $c$, pins $c'$, fans E and E', chamber A, slats $e$, slats F, fans H and H', and straw-chute L, substantially as described, and for the purpose set forth.

In testimony whereof I have signed my name to this specification in the presence of two subscribing witnesses.

JAMES BUCHANAN.

Witnesses:
BERNH. J. LIZIUS,
GOTTFR. KOEHLER.